Oct. 22, 1940.    H. R. GIBBONS    2,218,985
ROLLER BEARING
Filed Sept. 9, 1938

INVENTOR:
HAROLD R. GIBBONS,
BY Gales P. Moore
HIS ATTORNEY.

Patented Oct. 22, 1940

2,218,985

UNITED STATES PATENT OFFICE 2,218,985

ROLLER BEARING

Harold R. Gibbons, Chatham, N. J., assignor to General Motors Corporation, Detroit, Mich., a corporation of Delaware Application September 9, 1938, Serial No. 229,162

4 Claims. (Cl. 308—217)

This invention relates to roller bearings and comprises all of the features of novelty herein disclosed. An object of the invention is to provide an improved separator for antifriction rollers. Another object is to provide a roller separator which will have efficient guiding or steering contact with the rollers near their ends and near their pitch circle while the middle portions of the separator are supported on the rollers at points farther from the pitch circle, thereby to maintain a close fit of the rollers with the edges of the separator pockets. Another object is to provide a roller separator which will have the above mentioned efficient end guiding contact and peripheral support against the rollers without the expense of forming and bending wings, fingers, or other special parts, all in a separator of substantially uniform cross section and of simple form. To these ends and also to improve generally upon devices of this character, the invention consists in the various matters hereinafter described and claimed.

In the drawing disclosing one selected embodiment for illustration.

Figure 1:
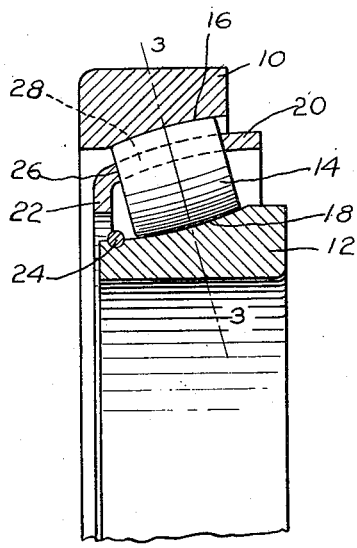
Fig. 1 is an axial section of a roller bearing.
Figure 3:
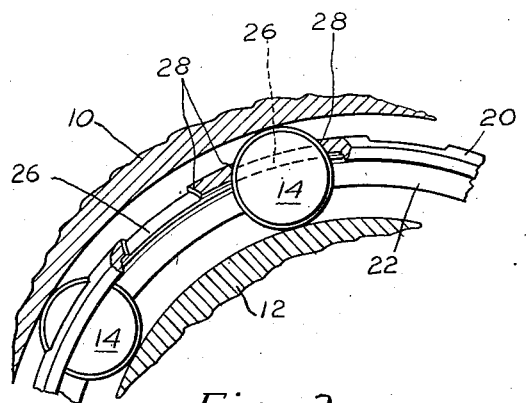
Fig. 3 is a fragmentary sectional view chiefly on the line 3—3 of Fig. 1, a portion of the separator being shown in side elevation from a plane parallel to line 3—3 and two roller pockets being empty.
Figure 4:
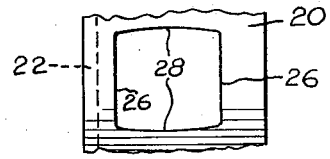
Fig. 4 is an outside radial view of one of the separator pockets.
Figure 2:
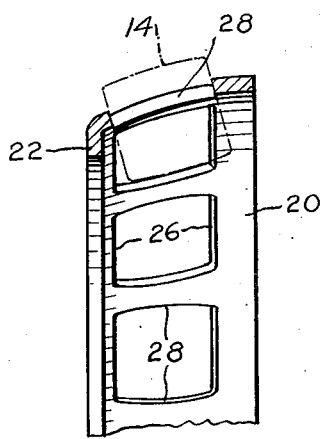
Fig. 2 is an axial section of a portion of the separator.

In Fig. 1 as one illustrative embodiment, there is shown an angular contact, self-aligning roller bearing comprising an outer race ring 10 and an inner race ring 12 with a series of elongated rollers 14 of barrel form. The outer raceway 16 is a spherical segment with a center of curvature in the bearing axis. The outer raceway 16 and the inner raceway 18 have each a radius of curvature slightly larger than the radius of lengthwise curvature of the rollers but the outer raceway has its radius of curvature slightly greater than that of the inner raceway. The rollers are spaced and guided by a separator comprising a circular ring or body portion 20 and an end flange 22. The separator is preferably of uniform thickness and hence can be cheaply produced from sheet metal. To retain the rollers and the separator assembled upon the inner race ring, a split spring ring 24 is snapped into a groove of the inner race ring but is clear of the rollers in the normal running position of the bearing.

The separator body 20 is curved in cross section, preferably having an enlargement or convexity which is presented outwardly so that the separator lies farther from the roller axes at the middle than at the ends. The separator has a series of pockets or openings for the rolling elements, the ends 26 of the pockets being flat surfaces to conform to the flat ends of the rollers. The sides or long edges 28 of the pockets conform to the peripheries of the rollers except for a slight clearance at the corners. In the illustrated form, the body of the separator lies wholly outside of the pitch circle of the rollers but the ends 26 of the roller pockets lie appreciably nearer to the pitch circle of the rollers than the middle portions of the long edges 28. Thus the end portions of the rollers are guided and steered near their pitch circle where they are largest in axial section and so can be best held from tilting or cocking in their raceways. In other words, the guiding edges are near a diameter of the roller where a nearly maximum section of the roller is embraced. On the other hand, the long edges 28 have their middle portions sufficiently far from the pitch circle, and from the roller diameter which is tangent to the pitch circle, that the rollers do not develop a sloppy fit upon slight wear of the separator edges as would occur if the cage body were extended across the bearing close to and parallel to the roller axes. In other words, the present improvement makes the wear on the separator supporting edges come near a chordal segment of the roller rather than near a diametrical segment. This advantage is emphasized by the diagrammatic showing in Fig. 5 of another construction.

Figure 5:
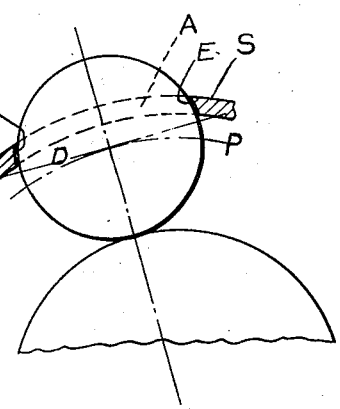
Fig. 5 is a diagram.

In Fig. 5, a cylindrical separator S has its roller pockets bounded by arcuate flat areas A and by curved edges E. The small circle represents one of a series of cylindrical rollers and the large circle represents a cylindrical inner race ring. A separator such as S, which is everywhere equidistant from the roller pitch circle P, would engage the periphery of the roller only at the opposite edges E which are near the ends of a diameter D tangent to the pitch circle. This contact would give good guiding and steering qualities but slight wear or initial clearance at the edges E would give the roller a loose or sloppy fit which is undesirable. This loose fit is avoided in the bearing of Figs. 1 to 4 because the convexity of the separator places the middle portions of the long edges 28 well out beyond the pitch circle and remote from a roller diameter tangent to the pitch circle yet the desirable end guiding of the rollers sufficiently near a diameter is also obtained. The rollers in these figures are not much longer than the diameter but it is evident that the advantages of the invention become more pronounced when the rollers are long in proportion to their diameter and when the transverse curvature of the separator is large because the middle portions of the roller pockets will then be much farther from the pitch circle than the ends. The body of the separator is preferably a spherical segment in the illustrated construction but this is not essential.

I claim:

1. In a roller bearing, a circular series of elongated rollers, a separator having a body portion lying outside of the pitch circle of the rollers, the body portion having elongated pockets for the rollers, and the body portion being convexly curved lengthwise of the rollers whereby the long edges of the roller pockets engage the roller peripheries well out beyond the pitch circle and the end portions of the roller pockets engage and guide the end portions of the rollers nearer to the pitch circle; substantially as described.

2. In an antifriction bearing, a circular series of elongated rollers, a separator having a body portion provided with elongated pockets substantially fitting the rollers, the short ends of the pockets extending across the ends of the rollers near a diameter which is tangent to the pitch circle, and the body portion of the separator being curved in cross section lengthwise of the rollers to make the middle portions of the long edges of the pockets engage the peripheries of the rollers at points more remote from said roller diameter, and the curvature of the body portion being substantially uniform for the full length of the rollers; substantially as described.

3. In a roller bearing, a circular series of elongated rollers, a separator ring having a body portion curved lengthwise of the rollers and provided with elongated pockets for the rollers, and the convexity of the separator body being presented outwardly whereby the long sides of the pockets lie farther from the roller pitch circle than the ends of the pockets, and the curvature of the body portion being substantially uniform for the full length of the rollers; substantially as described.

4. In a roller bearing, a circular series of elongated rollers, a separator having a body portion provided with elongated pockets substantially fitting the rollers, the body portion being of substantially uniform thickness throughout and having its middle area enlarged to make the long edges of the pockets engage the middle portions of the roller peripheries at a greater distance from the roller pitch circle than the ends of the pockets, and both the long edges and the ends of the pockets lying on the same side of the roller pitch circle; substantially as described.

HAROLD R. GIBBONS.